(12) United States Patent
Ju et al.

(10) Patent No.: US 12,058,277 B2
(45) Date of Patent: Aug. 6, 2024

(54) MOBILE TERMINAL

(71) Applicant: LG ELECTRONICS INC., Seoul (KR)

(72) Inventors: Jongkyu Ju, Seoul (KR); Sunggyu Koh, Seoul (KR); Minjong Lee, Seoul (KR); Sanghyuk Im, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 296 days.

(21) Appl. No.: 17/623,064

(22) PCT Filed: Jul. 8, 2019

(86) PCT No.: PCT/KR2019/008352
§ 371 (c)(1),
(2) Date: Dec. 27, 2021

(87) PCT Pub. No.: WO2021/006372
PCT Pub. Date: Jan. 14, 2021

(65) Prior Publication Data
US 2022/0272185 A1 Aug. 25, 2022

(51) Int. Cl.
*H04M 1/02* (2006.01)
*G06F 1/16* (2006.01)

(52) U.S. Cl.
CPC ........ *H04M 1/0216* (2013.01); *G06F 1/1652* (2013.01); *G06F 1/1681* (2013.01); *H04M 1/0268* (2013.01); *H04M 2201/38* (2013.01)

(58) Field of Classification Search
CPC .......... H04M 1/0216; H04M 1/02268; H04M 2201/38; G06F 1/1652; G06F 1/1681
(Continued)

(56) References Cited

U.S. PATENT DOCUMENTS 7,311,366 B2* 12/2007 Kim ...................... G06F 1/1641
49/383
9,348,450 B1* 5/2016 Kim .................... H04M 1/0268
(Continued)

FOREIGN PATENT DOCUMENTS

KR 10-1452871 B1 10/2014
KR 10-2016-0027625 A 3/2016
(Continued)

*Primary Examiner* — April G Gonzales
(74) *Attorney, Agent, or Firm* — Birch, Stewart, Kolasch & Birch, LLP

(57) ABSTRACT

The present invention provides a mobile terminal comprising: a pair of bodies provided on the rear surface of a flexible display panel; a pair of hinge portions connecting the pair of bodies to each other such that a folding mechanism of the pair of bodies can operate; a hinge cover provided between the pair of bodies for connecting the pair of hinge portions to each other; and a pair of supports provided on the front surfaces of the pair of bodies in order to support the flexible display panel and having fixed shafts on end portions thereof separated from each other such that the pair of supports respectively rotate with respect to the pair of bodies, wherein the hinge cover comprises a pair of guides supporting the end portions of the pair of supports, the end portions facing each other, and a first space provided between the pair of guides such that a curvature forming unit of the flexible display panel can be drawn therein or withdrawn therefrom.

16 Claims, 10 Drawing Sheets

(58) Field of Classification Search
USPC ........................................................ 455/575.3
See application file for complete search history.

(56) References Cited

U.S. PATENT DOCUMENTS

| | | | |
|---|---|---|---|
| 10,551,880 B1* | 2/2020 | Ai ......................... | G06F 1/1641 |
| 2013/0037228 A1* | 2/2013 | Verschoor ............. | G06F 1/1652 |
| | | | 160/377 |
| 2014/0355181 A1* | 12/2014 | Jung ..................... | G06F 1/1652 |
| | | | 361/679.01 |
| 2015/0257290 A1* | 9/2015 | Lee ...................... | H05K 5/0021 |
| | | | 361/749 |
| 2016/0378203 A1* | 12/2016 | Kim ..................... | H04M 1/022 |
| | | | 345/156 |
| 2018/0049329 A1* | 2/2018 | Seo .......................... | E05D 3/06 |
| 2018/0324964 A1* | 11/2018 | Yoo ......................... | F16C 29/02 |
| 2018/0375975 A1* | 12/2018 | Kikuchi ............... | G06F 1/1686 |
| 2019/0320048 A1* | 10/2019 | Yang .................... | G06F 1/1652 |
| 2023/0393632 A1* | 12/2023 | Hong .................... | G06F 1/1652 |

FOREIGN PATENT DOCUMENTS

| | | |
|---|---|---|
| KR | 10-2016-0083608 A | 7/2016 |
| KR | 10-2017-0026023 A | 3/2017 |
| KR | 10-2017-0030023 A | 3/2017 |
| KR | 10-2018-0005476 A | 1/2018 |
| WO | WO 2017/201097 A1 | 11/2017 |

* cited by examiner

FIG. 4
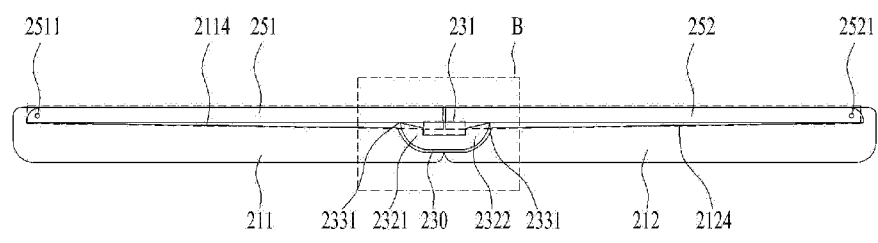
(a)
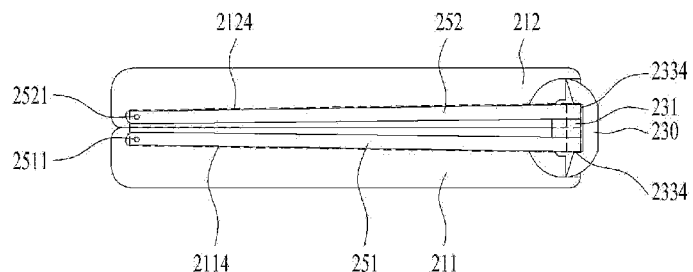
(b)

MOBILE TERMINAL

CROSS REFERENCE TO RELATED APPLICATIONS

This application is the National Phase of PCT International Application No. PCT/KR2019/008352, filed on Jul. 8, 2019, which is hereby expressly incorporated by reference into the present application.

TECHNICAL FIELD

The present disclosure relates to a mobile terminal, and more particularly, to a foldable mobile terminal applicable to a technical field of forming a single curvature radius by a flexible display panel when the foldable mobile terminal is folded.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

In addition, a mobile terminal may transceive information with an external device over shirt-range communication technologies such as Bluetooth™, Radio Frequency Identification (RFID), Infrared Data Association (IrDA), Ultra Wideband (UWB), ZigBee, Near Field Communication (NFC), Wireless Universal Serial Bus (Wireless USB) and the like.

A mobile terminal has a limited size in consideration of portability. As a size of a mobile terminal is limited, it may be difficult to provide a wide screen to a user through a display provided to the mobile terminal. Accordingly, recently, the development of a foldable mobile terminal that provides a larger screen to a user while increasing portability of the mobile terminal is in progress.

A foldable mobile terminal includes a flexible display panel folded together with a body. There is a problem in that wrinkles are formed on the flexible display panel when the radius of curvature is not uniformly formed in the process of folding the flexible display panel together with the body.

DISCLOSURE OF THE INVENTION

Technical Tasks

One technical task of the present disclosure is to prevent wrinkles from occurring on a flexible display panel in a manner that the flexible display panel included in a foldable mobile terminal forms a uniform curvature radius corresponding to a folding mechanism.

Technical Solutions

In one technical aspect of the present disclosure, provided is a mobile terminal including a pair of bodies having a flexible display panel provided to a backside, a pair of hinge parts connecting both sides to enable a pair of the bodies to perform a folding mechanism, a hinge cover provided between a pair of the bodies to connect a pair of the hinge parts together, and a pair of support parts provided to front sides of a pair of the bodies to support the flexible display panel and rotating with respect to a pair of the bodies by including fixed shafts at end portions spaced apart from each other, respectively, wherein the hinge cover may include a pair of guides supporting confronting end portions of a pair of the support parts and a first space provided between a pair of the guides so that a curvature forming part of the flexible display panel is inserted therein or withdrawn therefrom.

A pair of the guides may include a first edge supporting a pair of the support parts to be flush with each other in a state that a pair of the bodies are unfolded, an incline inclined from the first edge to the first space, and a second edge formed by neighboring an inner lateral surface forming the first space and the incline.

The inner lateral surface forming the first space may be inclined in a direction opposite to an inclined direction of the incline.

A pair of the bodies may include a second space for a pair of the support parts to rotate around the fixed shafts and a pair of the support parts may form a space for receiving the curvature forming part therein in a manner of contacting with the inner lateral surface in a state that a pair of the bodies are folded.

The curvature forming part may form a single curvature radius in a manner of being supported by a topside of the hinge cover in a state that a pair of the bodies are folded.

The flexible display panel may include an elastic metal layer passing by the curvature forming part.

The elastic metal layer may configure a backside of the flexible display panel and support the curvature forming part to form a uniform curvature radius in response to the folding mechanism of a pair of the bodies.

The elastic metal layer may have a restoring force corresponding to a minimum curvature radius formed by the curvature forming part.

The elastic metal layer may provide an external force enabling a pair of the support parts to rotate by contacting with a pair of the guides in response to the folding mechanism of a pair of the bodies.

The elastic metal layer may include shape memory alloy or amorphous metal.

The elastic metal layer may include Nitinol or Zr-based amorphous metal.

A pair of the bodies may include a pair of elastic members provided to positions spaced apart from the fixed shafts to provide attractive force to a pair of the support parts.

A pair of the bodies may include gear parts provided to both sides connected via the hinge part to rotate by engaging with each other.

The hinge part may include a pair of hinge shafts having a pair of the bodies connected thereto to rotate, respectively and a pair of stoppers projected along a shaft direction of the hinge shaft, wherein the stopper may be selectively inserted in a plurality of fixed recesses provided to correspond to a rotation angle of a pair of the bodies so as to fix a pair of the bodies at a preset angle.

A pair of the stoppers may be located to correspond to lateral sides of a pair of the guides and a stopper recess elastically supported by having a pair of the stoppers inserted therein may be partially included in a pair of the guides.

Advantageous Effects

Effects of a mobile terminal according to the present disclosure are described as follows.

The present disclosure may prevent a flexible display panel from being wrinkled due to an irregular curvature radius of the flexible display panel to respond to a folding mechanism of a foldable mobile terminal.

Since a pair of bodies completely overlap each other in a folded state of a foldable mobile terminal, the present disclosure may improve portability.

A foldable mobile terminal of the present disclosure may simply implement a hinge structure necessary for a flexible display panel to form a uniform curvature radius.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

DESCRIPTION OF DRAWINGS

FIG. 4 is a cross-sectional diagram of some components of a foldable mobile terminal related to the present disclosure, viewed in a direction A-A' of FIG. 2.

BEST MODE FOR INVENTION

Figure 1:
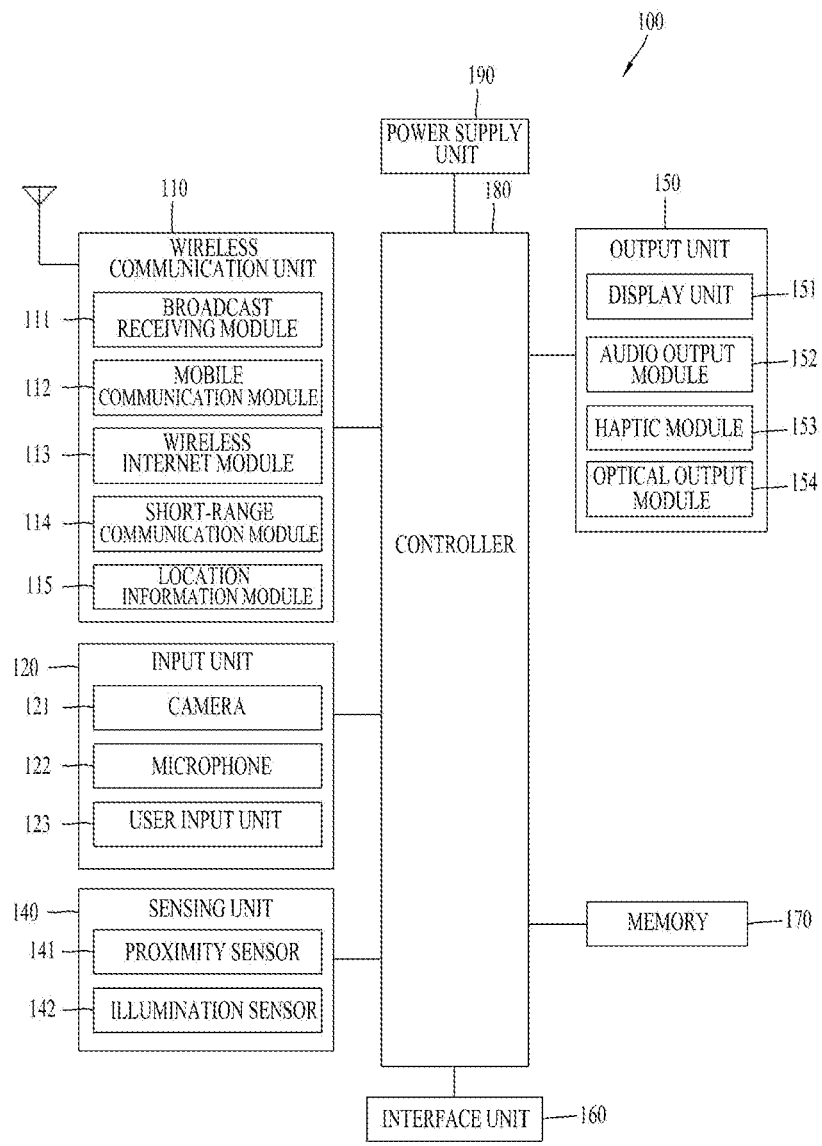
FIG. 1 is a block diagram of a mobile terminal in accordance with the present disclosure.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

FIG. 1 is a block diagram of a mobile terminal in accordance with the present disclosure.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components in FIG. 1 is not a requirement, and that greater or fewer components may alternatively be implemented than the components listed above.

More specifically, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed as a user's control command.

The sensing unit 140 is typically implemented using one or more sensors configured to sense internal information of the mobile terminal, the surrounding environment of the mobile terminal, user information, and the like. For example, the sensing unit 140 may alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output, or activating application programs stored in the memory 170.

To drive the application programs stored in the memory 170, the controller 180 may be implemented to control a predetermined number of the components mentioned above in reference with FIG. 1. Moreover, the controller 180 may be implemented to combinedly operate two or more of the components provided in the mobile terminal 100 to drive the application programs.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized on the mobile terminal by driving of one or more application problems stored in the memory 170.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sensing unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 may be provided with the power supplied by an external power source and the power supplied therein under the control of the controller 180 so as to supply the needed power to each of the components. The power supply unit 190 may include a battery. The battery may be a built-in type which is rechargeable and detachably loaded in the terminal to be charged.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Figure 2:
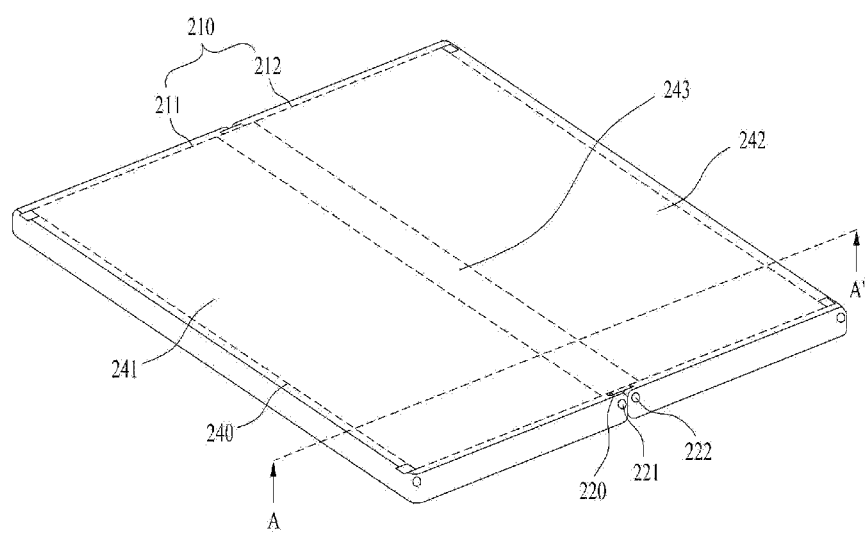
FIG. 2 is a perspective diagram of a foldable mobile terminal related to the present disclosure, viewed in one direction.

FIG. 2 is a perspective diagram of a foldable mobile terminal related to the present disclosure, viewed in one direction.

A mobile terminal of the present disclosure may include a pair of bodies 210 including a first body 211 and a second body 212 and a hinge part 220 provided between the first body 211 and the second body 12 to connect a pair of the bodies 210 together by a folding mechanism.

A pair of the bodies 210 of the present disclosure may support a flexible display panel 240. Specifically, the flexible display panel 240 of the present disclosure may include a first region 241 supported by the first body 211, a second region 242 supported by the second body 212, and a third region 243 provided between the first region 241 and the second region 242. Here, the third region 243 is a region provided with the hinge part 220 in the flexible display panel and may include a curvature forming part having a shape changed in response to the folding mechanism of a pair of the bodies 210.

The present disclosure intends to provide a structure of preventing wrinkles in a manner that the curvature forming part forms a uniform curvature in response to the folding mechanism. Specifically, the curvature forming part may form a uniform curvature radius in response to a folding angle of a pair of the bodies 210. In addition, the curvature radius formed by the curvature forming part of the present disclosure may be uniform along a folding axis.

Figure 3:
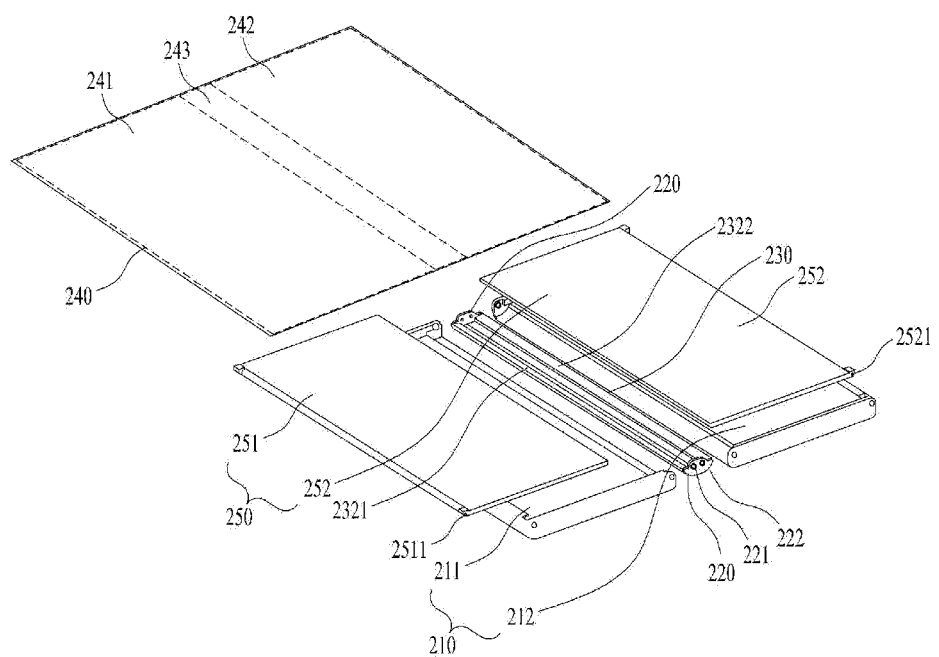
FIG. 3 is a partial exploded perspective diagram of a foldable mobile terminal related to the present disclosure.

FIG. 3 is a partial exploded perspective diagram of a foldable mobile terminal related to the present disclosure.

The present disclosure may include a pair of bodies 210 provided to a backside of the flexible display panel 240, a pair of hinge parts 220 connecting a pair of the bodies 210 to perform a folding mechanism, a hinge cover 230 provided between a pair of the bodies 210 to connect a pair of the hinge parts, and a pair of support parts 250 provided to a front side of a pair of the bodies 210 to support the flexible display panel 240 and rotate with respect to a pair of the bodies 210 by including fixed shafts 2511 and 2521 provided to end portions spaced apart from each other, respectively.

A pair of the support parts 250 of the present disclosure may include a first support part 251 supporting a first region 241 of the flexible display panel 240 and a second support part 252 supporting a second region 242 of the flexible display panel 240. Specifically, the flexible display panel 240 may maintain a planar state in a manner that the first region 241 is attached to the first support part 251. In addition, the flexible display panel 240 may maintain the planar state in a manner that the second region 242 is attached to the second support part 252. A third region 243 provided between the first region 241 and the second region 242 may be supported by end portions of the first and second support parts 251 and 252. Yet, since the third region 241 is not attached to the first support part 251 and the second support part 242, it may form a curvature.

A pair of the hinge part 220 of the present disclosure may include a pair of hinge shafts 221 and 222 connecting a pair of the bodies to rotate. A hinge cover 230 of the present disclosure connects a pair of the hinge parts 220 and may form a first space 231 on a backside of the third region 243 of the flexible display panel 240. The first space 231 may be provided between a pair of guides 2321 and 2322 supporting confronting end portions of a pair of the support parts 250. Specifically, a pair of the guides 2321 and 2322 may include a first guide 2321 supporting the end portion of the first support part 251 and a second guide 2522 supporting the end portions of the second support part 252.

The first space 231 of the present disclosure may include a space in/from which the third region 243 of the flexible display panel 240 is inserted/withdrawn in response to the folding mechanism of a pair of the bodies 210. Specifically, when a pair of the bodies 210 are folded, the third region 243 of the flexible display panel 240 may form a curvature and may be inserted in the first space 231. Namely, the hinge cover 230 of the present disclosure forms the first space 231 so as to correct the length of the flexible display panel 240 in response to the folding mechanism of a pair of the bodies 210.

In addition, the first space 231 of the present disclosure may include a space in/from which the confronting end portions of a pair of the support parts 250 are inserted/withdrawn in response to the folding mechanism of a pair of the bodies 210. Hereinafter, the mechanism of a pair of the support parts 250 corresponding to the folding mechanism of a pair of the bodies 210 will be described.

Figure 5:
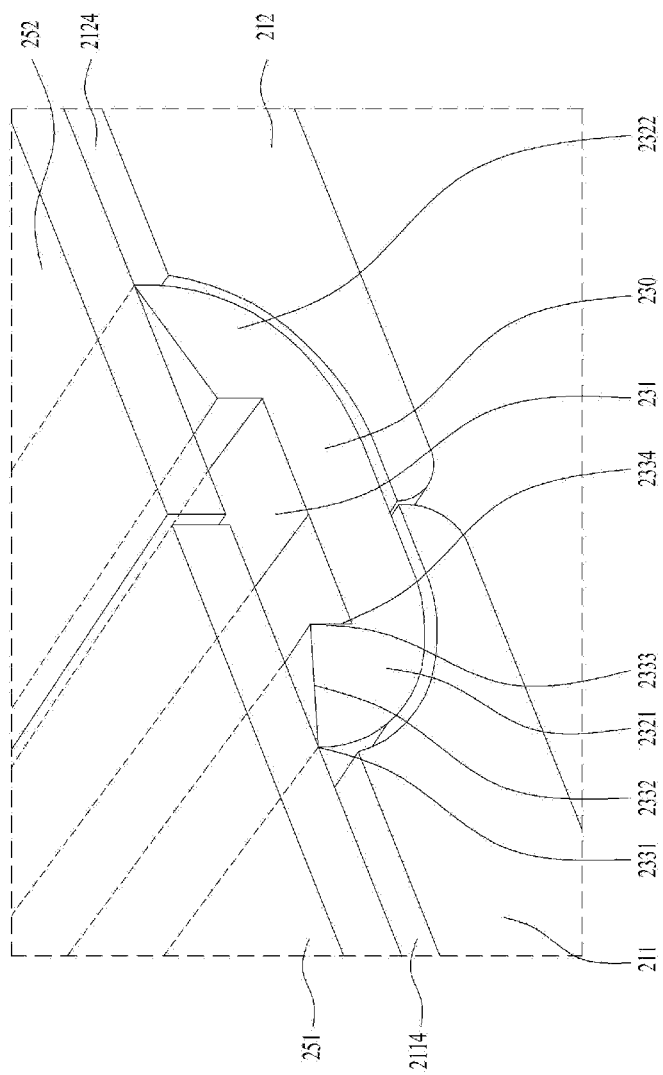
FIG. 5 is an enlarged perspective diagram of a region B of FIG. 4.

FIG. 4 is a cross-sectional diagram of some components of a foldable mobile terminal related to the present disclosure, viewed in a direction A-A' of FIG. 2. FIG. 5 is an enlarged perspective diagram of a region B of FIG. 4.

A pair of the support parts 251 and 252 are provided with the fixed shafts 2511 and 2521 provided to the spaced end portions, thereby rotating with respect to a pair of the bodies 211 and 212, respectively. Specifically, the first support part 251 is provided to the front side of the first body 211, thereby rotating centering around the first fixed shaft 2511. The first body 211 may include a space 2114 for enabling the first support part 251 to rotate. Likewise, the second support part 252 is provided to the front side of the second body 212, thereby rotating centering around the second fixed shaft 2512. The second body 212 may include a space 2124 for enabling the second support part 252 to rotate. The spaces 2114 and 2124 in which a pair of the support parts 251 and 252 rotate may be configured in a manner that the front sides of a pair of the bodies 211 and 212 are inclined in a direction of the hinge cover 230, respectively.

Specifically, FIG. 4(*a*) shows an embodiment that a pair of the support parts 251 and 252 are supported by the hinge cover 230 in a state that the foldable mobile terminal is unfolded. Specifically, a pair of the support parts 251 and 252 may be flushed with each other in a manner of being supported by a pair of the guides 2321 and 2322 of the hinge cover 230 in the rotating spaces 2114 and 2124.

The hinge cover 230 of the present disclosure is specifically illustrated in FIG. 5. The hinge cover 230 may include a first guide 2321 supporting the first support part 251 and a second guide 2322 supporting the second support part 252. As the first support part 251 and the second support part 252 are spaced apart from each other, the first space 231 may be included between the first and second support parts 251 and 252. A pair of the guides 2321 and 2322 may include a first edge 2331 supporting a pair of the support parts 251 and 252 to be flush with each other in a state that a pair of the bodies 211 and 212 are unfolded, an incline 2332 inclined from the first edge 2331 toward the first space 231, and a second edge 2333 formed in a manner that an inner lateral surface 2334 forming the first space 231 neighboring the incline 2332. As a pair of the support parts 251 and 252 are supported by the first edge 2331 of a pair of the guides 2321 and 2322 in a state that a pair of the bodies 211 and 212 are unfolded, they may be provided in a manner of being spaced apart from the front sides of a pair of the bodies 211 and 212 in the rotating spaces 2114 and 2124.

A pair of the support parts 251 and 252 of the present disclosure may rotate along outer surfaces of a pair of the guides 2321 and 2322 in response to the folding mechanism of a pair of the bodies 211 and 212. Specifically, FIG. 4(*b*) shows an embodiment that a pair of the support parts 251 and 252 contact with the inner lateral surfaces 2334 of a pair of the guides 2321 and 2322, respectively in a state that a pair of the bodes 211 and 212 are folded. A pair of the support parts 251 and 252 of the present disclosure may rotate in the spaces 2114 and 2124 centering around the fixed shafts 2511 and 2521 so as to contact with the inner lateral surfaces 2334 of a pair of the guides 2321 and 2322, respectively and may form a space in which the flexible display panel 240 forms a curvature. In this case, the inner lateral sides 2334 of a pair of the guides 2321 and 2322 may differ from the inclines 2322 in an inclined direction, respectively. Namely, a pair of the guides 2321 and 2322 rotating centering around the fixed shafts 2511 and 2521 contact with the inner lateral sides 2334, whereby a space for the flexible display panel 240 to form the curvature can be increased.

Described in the following is an embodiment that an external force for a pair of the support parts 251 and 252 to rotate by contacting with a pair of the guides 2321 and 2322 in response to the folding mechanism of a pair of the bodies 211 and 212 is provided via an elastic metal layer configuring the backside of the flexible display panel 240.

Figure 6:
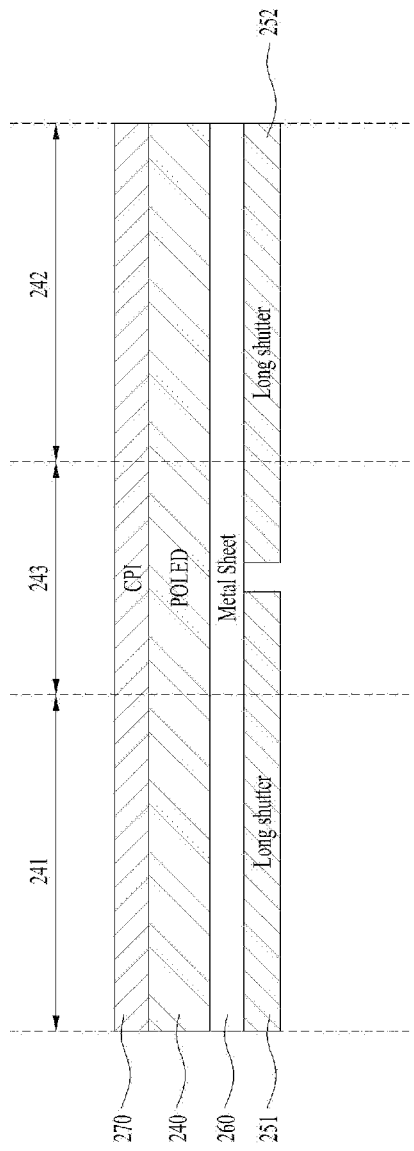
FIG. 6 is a conceptual diagram illustrating the relation between a flexible display panel of the present disclosure and an adjacent configuration.

FIG. 6 is a conceptual diagram illustrating the relation between a flexible display panel of the present disclosure and an adjacent configuration.

The foldable mobile terminal of the present disclosure may include an elastic metal layer 260 provided between the flexible display panel 240 and a pair of the support parts 251 and 252. In some cases, the elastic metal layer 260 may include a layer that configures the flexible display panel 240. Specifically, the elastic metal layer 260 may be configured to pass through the curvature forming part of the flexible display panel 240. Here, the curvature forming part may include the third region 243 provided between the first region 241 fixed to the first support part 251 and the second region 242 fixed to the second support part 252 in the flexible display panel 240. A protective film 270 may be formed on a whole surface of the flexible display panel 240 of the present disclosure.

The elastic metal layer 260 of the present disclosure may pass by the curvature forming part 243 and configure the backside of the flexible display panel 240. The elastic metal layer 260 forms the curvature with the flexible display panel 240, and may support the curvature forming part 243 to form the uniform curvature radius.

The elastic metal layer 260 of the present disclosure may have a restoring force corresponding to a minimum curvature radius formed by the curvature forming part 243. Namely, the elastic metal layer 260 may have elasticity of restoration into an original state without shape deformation at a radius greater than the minimum curvature radius formed by the curvature forming part 243. Here, the minimum curvature radius may be determined by an internal structure of the foldable mobile terminal of the present disclosure. In some cases, the minimum curvature radius formed by the flexible display panel 240 may be determined in consideration of the restoring force of the elastic metal layer 260.

The elastic metal layer 260 of the present disclosure may include shape memory alloy or amorphous metal. Particularly, the elastic metal layer 260 may include Nitinol or Zr-based amorphous metal.

The elastic metal layer 260 of the present disclosure may realize a smaller minimum curvature radius formed by the flexible display panel 240 as the restoring force increases. When the maximum curvature radius is small, the space required when the foldable mobile terminal is folded is small, so that the foldable mobile terminal may be implemented in a smaller volume. Accordingly, the elastic metal layer 260 used in the present disclosure is not limited to the above metal, and a metal material having higher elasticity may be used.

Figure 7:
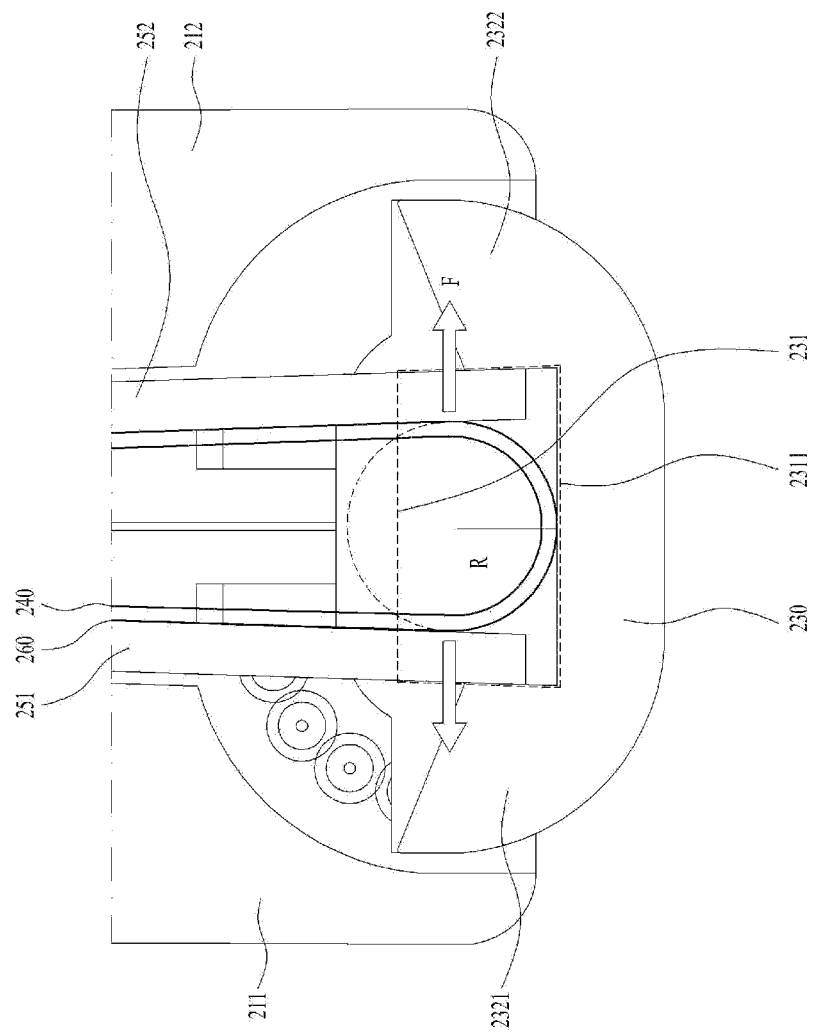
FIG. 7 is a diagram to describe the principle of forming a uniform curvature radius by a flexible display panel of the present disclosure.

FIG. 7 is a diagram to describe the principle of forming a uniform curvature radius by a flexible display panel of the present disclosure. FIG. 7 shows a cross-section in a folded state of a pair of the bodies 211 and 212.

The flexible display panel 240 of the present disclosure includes the elastic metal layer 260 on its backside, whereby the curvature forming part may form a uniform curvature radius.

The flexible display panel 240 of the present disclosure includes the elastic metal layer 260 on its backside, thereby forming a single curvature radius R in a fully folded state off a pair of the bodies 211 and 212.

Specifically, the flexible display panel 240 of the present disclosure may form a single curvature radius R in a state that a pair of the bodies 211 and 212 are fully folded through the elastic metal layer 260 passing through the curvature forming part and the top side 2311 of the hinge cover 230 supporting the curvature forming part.

The flexible display panel 240 of the present disclosure is supported by the topside 2311 of the hinge cover 230 in a state that a pair of the bodies 211 and 212 are fully folded, thereby forming a single curvature radius R. Particularly, the topside 2311 of the hinge cover 230 may support the curvature forming part, whereby the curvature forming part forms a uniform curvature radius in a process that a pair of the bodies 211 and 212 are folded.

The elastic metal layer 260 of the present disclosure may provide an external force F, so that a pair of the support parts 251 and 252 rotate by contacting with a pair of the guides 2321 and 2322 in response to the folding mechanism of a pair of the bodies 211 and 212. The external force F may be formed via a restoring force generated from folding the elastic metal layer 260. Particularly, FIG. 7 shows an embodiment that a pair of the support parts 251 and 252 contact with the inner lateral surfaces of a pair of the guides 2321 and 2322, respectively by the external force F provided by the elastic metal layer 260 in a state that a pair of the bodies 211 and 212 are fully folded.

Yet, in some cases, the restoring force of the elastic metal layer 260 may not provide an external force F enough for a pair of the support parts 251 and 252 to rotate along outer surfaces of a pair of the guides 2321 and 2322, respectively. In this case, at least one of a pair of the support parts 251 and 252 is spaced apart from a pair of the guides 2321 and 2322, whereby the curvature forming part may not form a uniform curvature. Described in the following is an addition embodiment that a pair of the support parts 251 and 252 rotate along the outer surfaces of a pair of the guides 2321 and 2322, respectively.

Figure 8:
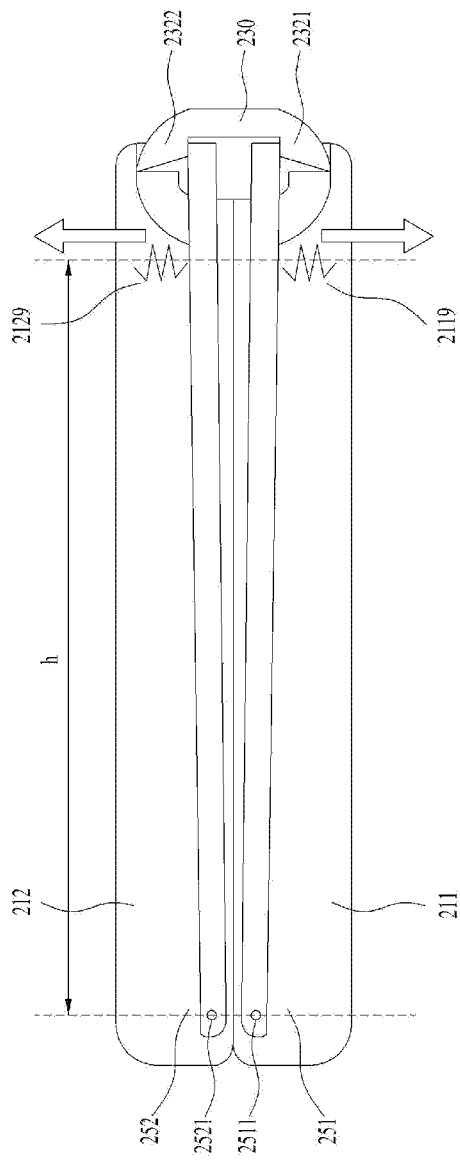
FIG. 8 is a diagram to describe a foldable mobile terminal according to another embodiment of the present disclosure.

FIG. 8 is a diagram to describe a foldable mobile terminal according to another embodiment of the present disclosure.

A pair of the bodies 211 and 212 of the present disclosure may include a pair of elastic members 2129 and 2119 provide to locations spaced apart from the fixed shafts 2511 and 2521 to provide attractive force to a pair of the support parts 251 and 252, respectively.

If a distance h of each of a pair of the elastic members 2129 and 2119 spaced apart from the fixed shafts 2511 and 2521 increases more, a pair of the support parts 251 and 252 may need a less force to maintain the state that a pair of the support parts 251 and 2522 contact with a pair of the guides 2321 and 2322 of the hinge cover 230, respectively.

Particularly, FIG. 8 shows an embodiment that a pair of the support parts 251 and 252 contact with a pair of the guides 2321 and 2322 by a pair of the elastic members 2129 and 2119, respectively in a state that a pair of the bodies 211 and 212 are folded. Through a pair of the elastic members 2129 and 2119, a pair of the support parts 251 and 252 spaced apart from each other may form an inner space for the flexible display panel 240 to form a curvature.

According to the present disclosure, as described in the embodiment of FIG. 7, the external force for maintaining a state that a pair of the support parts 251 and 252 contact with a pair of the guides 2321 and 2322 of the hinge cover 230 may be provided through the elastic metal layer 260. The external force F may be supplemented via a pair of the elastic members 229 and 2119.

Figure 9:
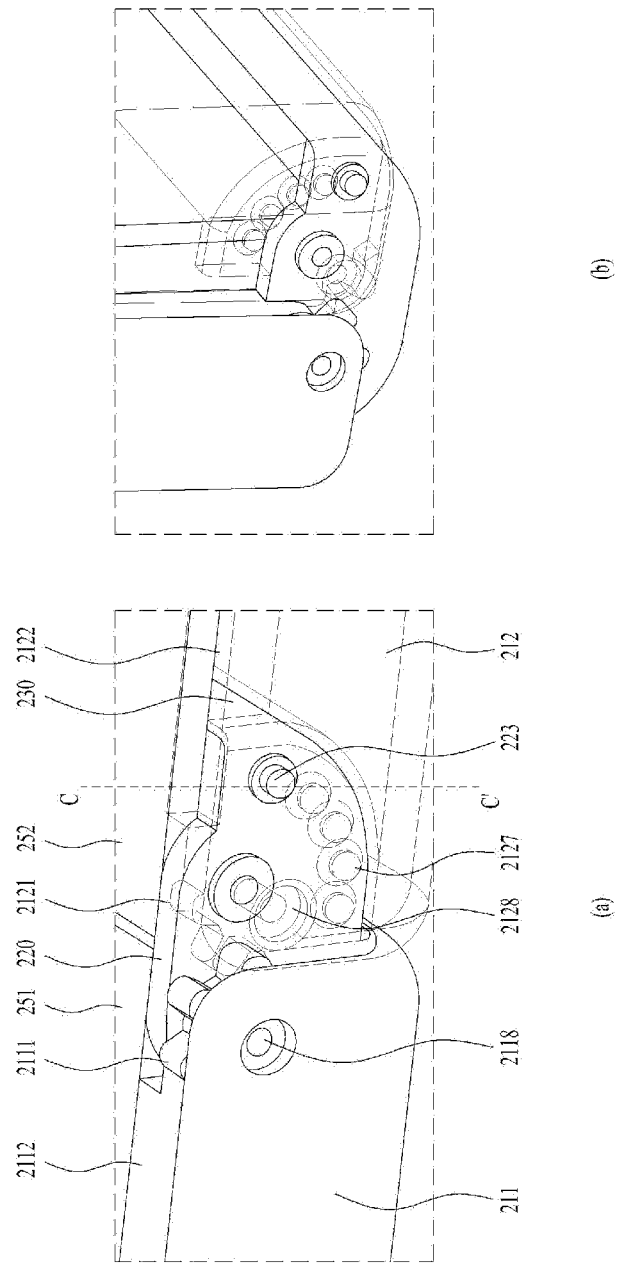
FIG. 9 and FIG. 10 are diagrams to describe the drive principle of a hinge part of the present disclosure.
Figure 10:
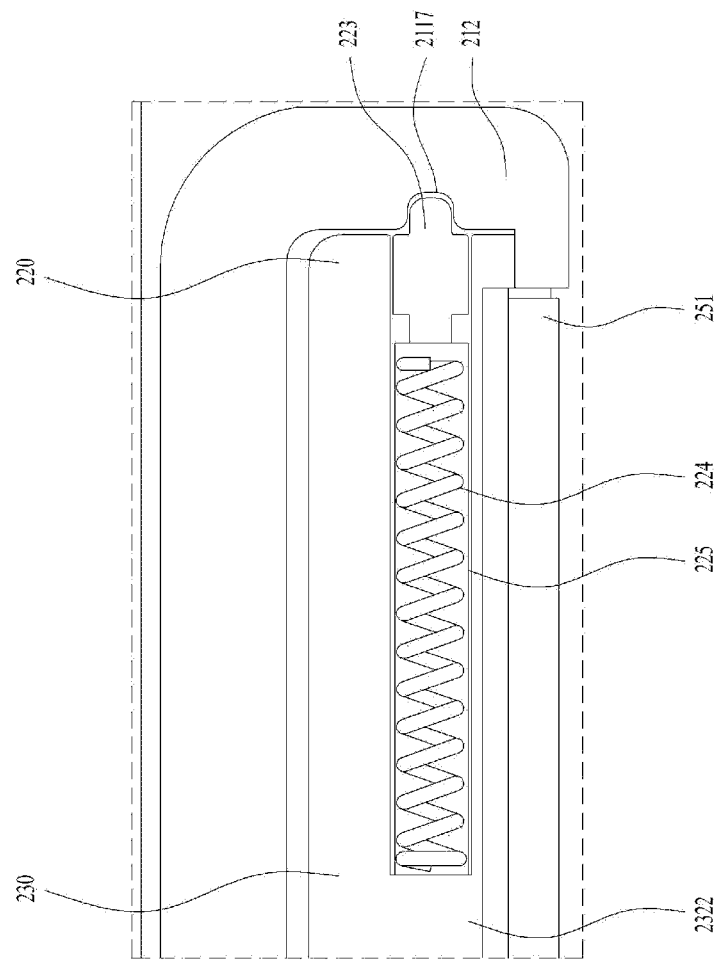

FIG. 9 and FIG. 10 are diagrams to describe the drive principle of a hinge part of the present disclosure.

A pair of the bodies 211 and 212 of the present disclosure may include bezel parts 2112 and 2122 on the edges of a pair of the support parts 251 and 252, respectively. A pair of the bodies 211 and 212 of the present disclosure may include the hinge part 220 connecting both sides. Particularly, the hinge part 220 of the present disclosure may include the bezel parts 2112 and 2122 inside.

A pair of the bodies 211 and 212 of the present disclosure may be configured in a manner that both sides may rotate around a first hinge shaft 2118 and a second hinge shaft 2128 provided to the hinge part 220, respectively. In this case, a pair of the bodies 211 and 212 may have both sides to contact with each other, and may include gear parts 2111 and 2121 rotating by engaging with the contacting sides, respectively. A pair of the bodies 211 and 212 of the present disclosure rotates in directions opposite to the first and second hinge shafts 2118 and 2128 through the gear parts 2111 and 2121, respectively, but may rotate at the same angle.

The hinge part 220 of the present disclosure may include a pair of stoppers 223 projected along the shaft directions of the hinge shafts 2118 and 2128. The stopper 223 is selectively inserted in a fixed recess 2127 provided to correspond to the rotation angle of a pair of the bodies 211 and 212, thereby fixing a pair of the bodies 211 and 212 at a preset angle. Particularly, FIG. 9(a) shows an embodiment that the stopper 223 is selectively inserted in the fixed recess 2127 to enable a pair of the bodies 211 and 212 to be fixed in an unfolded state. FIG. 9(b) shows an embodiment that the stopper 223 is selectively inserted in the fixed recess 2127 to enable a pair of the bodies 211 and 212 to be fixed in a folded state.

A pair of the stoppers 223 of the present disclosure may be located to correspond to the lateral sides of a pair of the guides 2321 and 2322, and the stopper recess 225 having a pair of the stoppers 223 inserted therein to be elastically supported may be included in a pair of the guides 2321 and 2322 in part. Particularly, FIG. 10 shows an embodiment that one end of the stopper 223 is inserted in the fixed recess 2117 provided to the second body 212 and that the other end if supported by the elastic member 224. In this case, the stopper recess 225 provided with the elastic member 224 and a portion of the stopper 223 may be partially included in the second guide 2322 provided to the hinge cover 230. Namely, the stopper 223 is provided to the position corresponding to the second guide 2322, thereby securing a sufficient length of the stopper recess 225. This is because the thickness of the hinge part 220 is not enough to implement the stopper recess 225.

The above detailed description should not be construed as being limitative in all terms, but should be considered as being illustrative. The scope of the present invention should be determined by reasonable analysis of the accompanying claims, and all changes in the equivalent range of the present invention are included in the scope of the present invention.

What is claimed is:

1. A mobile terminal, comprising:
    a pair of bodies having a flexible display panel provided to a backside;
    a pair of hinge parts connecting both sides to enable the pair of the bodies to perform a folding mechanism;
    a hinge cover provided between the pair of the bodies to connect the pair of the hinge parts together; and
    a pair of support parts provided to front sides of the pair of the bodies to support the flexible display panel and rotating with respect to the pair of the bodies by including fixed shafts at end portions spaced apart from each other, respectively,
    wherein the hinge cover comprises a pair of guides supporting confronting end portions of the pair of the support parts and a first space provided between the pair of the guides so that a curvature forming part of the flexible display panel is inserted therein or withdrawn therefrom,
    wherein the pair of the guides comprise:
        a first edge supporting the pair of the support parts to be flush with each other in a state that the pair of the bodies are unfolded;
        an incline inclined from the first edge to the first space; and
        a second edge formed by neighboring an inner lateral surface forming the first space and the incline.

2. The mobile terminal of claim 1, wherein the inner lateral surface forming the first space is inclined in a direction opposite to an inclined direction of the incline.

3. The mobile terminal of claim 2, wherein the pair of the bodies comprise a second space for the pair of the support parts to rotate around the fixed shafts, and
    wherein the pair of the support parts form a space for receiving the curvature forming part therein in a manner of contacting with the inner lateral surface in the state that the pair of the bodies are folded.

4. The mobile terminal of claim 1, wherein the curvature forming part forms a single curvature radius in a manner of being supported by a topside of the hinge cover in the state that the pair of the bodies are folded.

5. The mobile terminal of claim 1, wherein the flexible display panel comprises an elastic metal layer passing by the curvature forming part.

6. The mobile terminal of claim 5, wherein the elastic metal layer configures a backside of the flexible display panel and supports the curvature forming part to form a uniform curvature radius in response to the folding mechanism of the pair of the bodies.

7. The mobile terminal of claim 5, wherein the elastic metal layer has a restoring force corresponding to a minimum curvature radius formed by the curvature forming part.

8. The mobile terminal of claim 5, wherein the elastic metal layer provides an external force enabling the pair of the support parts to rotate by contacting with the pair of the guides in response to the folding mechanism of the pair of the bodies.

9. The mobile terminal of claim 5, wherein the elastic metal layer comprises shape memory alloy or amorphous metal.

10. The mobile terminal of claim 9, wherein the elastic metal layer comprises Nitinol or Zr-based amorphous metal.

11. The mobile terminal of claim 1, wherein the pair of the bodies comprise a pair of elastic members provided to positions spaced apart from the fixed shafts to provide attractive force to the pair of the support parts.

12. The mobile terminal of claim 1, wherein the pair of the bodies comprise gear parts provided to both sides connected via the hinge part to rotate by engaging with each other.

13. The mobile terminal of claim 1, the hinge part comprising:
    a pair of hinge shafts having the pair of the bodies connected thereto to rotate, respectively; and
    a pair of stoppers projected along a shaft direction of the hinge shaft,
    wherein one of the stoppers is selectively inserted in a plurality of fixed recesses provided to correspond to a rotation angle of the pair of the bodies so as to fix the pair of the bodies at a preset angle.

14. The mobile terminal of claim 13, wherein the pair of the stoppers are located to correspond to lateral sides of the pair of the guides, and wherein a stopper recess elastically supported by having the pair of the stoppers inserted therein is partially included in the pair of the guides.

15. A mobile terminal, comprising:
a pair of bodies having a flexible display panel provided to a backside;
a pair of hinge parts connecting both sides to enable the pair of the bodies to perform a folding mechanism so that the pair of bodies can be converted into an unfolded or folded state;
a hinge cover provided between the pair of the bodies to connect the pair of the hinge parts together; and
a pair of support parts provided to front sides of the pair of the bodies to support the flexible display panel and rotating with respect to the pair of the bodies by including fixed shafts at end portions spaced apart from each other, respectively,
wherein the hinge cover comprises:
a topside;
a pair of guides supporting both sides of the topside; and
a first space surrounded by the pair of the guides and the topside and a curvature forming part of the flexible display panel being inserted therein, and
wherein the pair of the support parts contact with inner lateral surfaces of the pair of the guides, respectively, in a folding state.

16. The mobile terminal of claim 15, wherein the flexible display panel comprises an elastic metal layer passing by the curvature forming part, and
wherein the curvature forming part forms a single curvature radius in a manner of being supported by the topside of the hinge cover in the folding state.

* * * * *